April 26, 1960 J. A. CHILMAN ET AL 2,934,153
HYDRAULIC VARIABLE PITCH PROPELLERS
Filed July 15, 1957
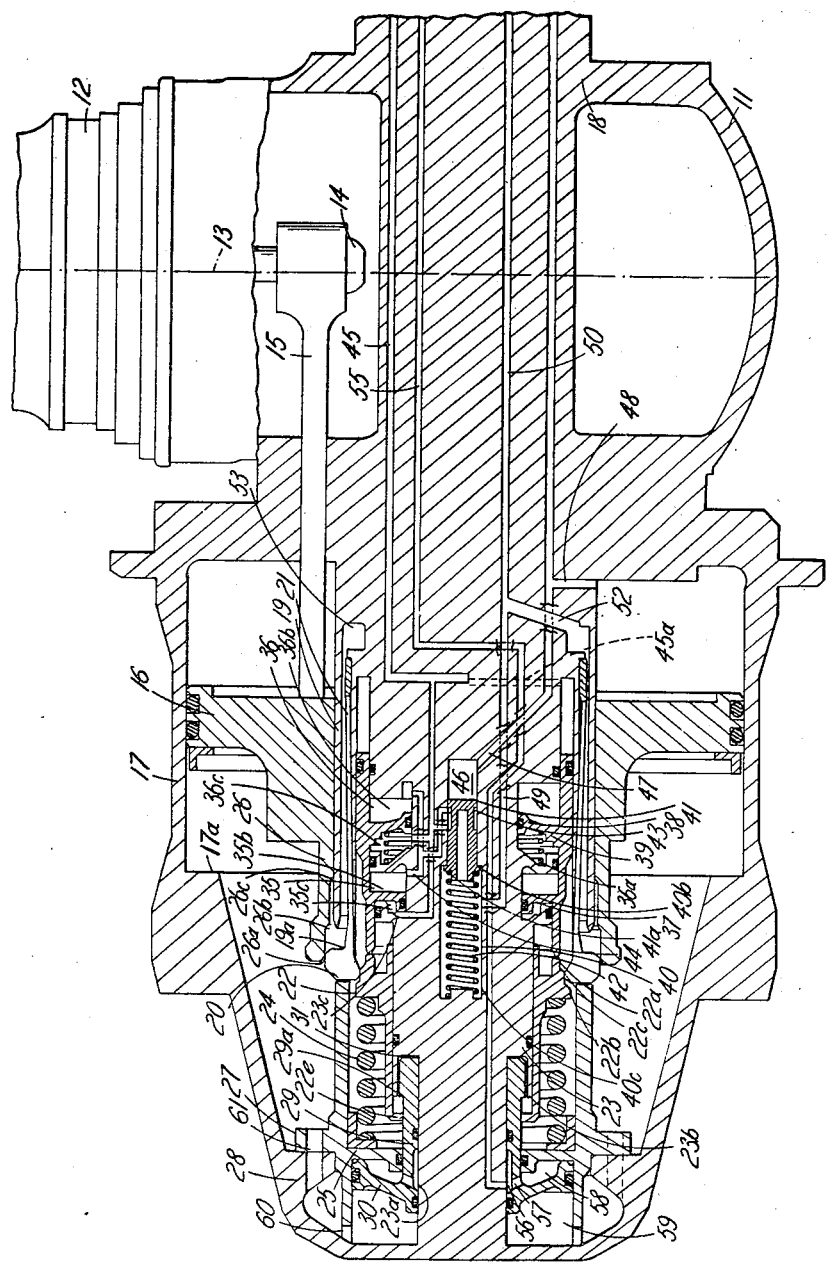

United States Patent Office 2,934,153
Patented Apr. 26, 1960

2,934,153

HYDRAULIC VARIABLE PITCH PROPELLERS

John Alfred Chilman and Ivor Harold Brooking, Gloucester, England, assignors to Rotol Limited, Gloucester, England, a British company Application July 15, 1957, Serial No. 671,783

Claims priority, application Great Britain March 8, 1957

18 Claims. (Cl. 170—160.32)

This invention relates to hydraulic variable pitch propellers.

According to the present invention there is provided a hydraulic variable pitch propeller comprising a hub, a plurality of propeller blades journalled on the hub for rotation each about its longitudinal pitch change axis, a double acting hydraulic pitch change motor in said hub, said motor being operatively connected with said blades and comprising a ram and cylinder movable relative to one another to adjust the pitch of the propeller, decrease pitch fluid conduit means for leading hydraulic fluid to and from the decrease pitch side of said pitch change motor, increase pitch fluid conduit means for leading hydraulic fluid to and from the increase pitch side of said pitch change motor, a first positive mechanical stop means operative to prevent relative movement of said ram and cylinder to adjust the propeller into a pitch less than a first predetermined pitch, a second positive mechanical stop means operative to prevent relative movement of said ram and cylinder to adjust the propeller into a pitch less than said second predetermined pitch, said second predetermined pitch being less than said first predetermined pitch, first hydraulically operable stop withdrawal means operable to render said first positive mechanical stop means inoperative, second stop means operative to prevent relative movement of said ram and cylinder to adjust the propeller into a pitch less than a second predetermined pitch, said second predetermined pitch being less than said first predetermined pitch, second hydraulically operable stop withdrawal means operable to render said second stop means inoperative, hydraulic fluid conduit means separate from said decrease pitch and increase pitch fluid conduit means for leading hydraulic fluid to said second stop withdrawal means to operate said second stop withdrawal means, duct means connecting said decrease pitch fluid conduit means to said first stop withdrawal means and valve means in said duct means operable when the pressure of fluid in said decrease pitch fluid conduit means is increased above a normal operating maximum value to permit the supply of hydraulic fluid through said duct means from said decrease pitch fluid conduit means to said first stop withdrawal means to operate said first stop withdrawal means.

Preferably said valve means is operable by the pressure of fluid in said decrease pitch fluid conduit means.

In one form of propeller according to the present invention said first stop means is a flight cruise stop and said second stop means is a flight fine pitch stop, and a propeller of this form will now be described in greater detail, merely by way of example, and with reference to the accompanying drawing which is a somewhat diagrammatic cross-sectional side elevation of the propeller.

Referring to the drawing, the propeller comprises a hub 11 upon which are journalled blades 12 for rotation about their longitudinal pitch change axes 13. Each blade comprises a crank pin 14 at its root end coupled by a connecting rod 15 to the ram 16 of a pitch change motor slidable to adjust the pitch of the propeller in a cylinder 17 arranged coaxially with the driving shaft 18 of the propeller and in the nose portion of the hub 11. The ram 16 is of annular form and slides on a stationary barrel 19 housing first and second positive mechanical stop means operative to prevent movement of the ram 16 relative to the cylinder 17 to the left in the drawing to adjust the propeller into a pitch less than a first predetermined pitch and a second predetermined pitch which is less than said first predetermined pitch respectively. The positive mechanical stop means together comprise a ring of stops 20. The stops 20 are mounted each upon one end of a resilient finger 21 secured at its other end within the barrel and are prevented from moving inwardly by a stop retaining member in the form of a ring 22 which is slidably mounted upon a core 23 within the barrel 19. The ring 22 has a stepped outer periphery having a radially outer step 22b, a step 22c disposed radially inwardly of the step 22b, and a radially inner step 22d, and a coil spring 24 is interposed between the ring and an inwardly directed radial flange 25 formed on the inner wall of the barrel 19.

The stops 20 may lie in the path of movement of one or more of the chamfered shoulders 26a, 26b and 26c formed on the inner diameter of a stepped sleeve 26 projecting forwardly from and forming part of the ram 16. These shoulders normally positively limit the movement of the ram to the left in the drawing depending upon the position of the stops 20 as hereinafter described. The barrel 19 is provided with suitable slots 19a through which the stops 20 project radially outwardly, and extends forwardly beyond the stops. An external radial flange 27 engages with and is connected to a flange 28 integral with the inner wall of the cylinder 17 near its forward end.

The ring 22 is provided at its forward end with an inturned part or flange 22e which when the ring 22 is in its extreme rearward position engages a forwardly facing shoulder 29a formed at the rearward end of a sleeve 29. The latter has a radially outwardly directed flange forming an annular jack piston 30, and is slidable upon a reduced diameter part 23a of the core 23, the piston 30 working in a cylinder formed by the forward part of the barrel 19, the flange 25 and the nose of the cylinder 17. The rearward end of the sleeve 29 enters an annular recess 31 formed in the core 23. The forwardly projecting annular part of the core enclosing the recess 31 provides a stop at 23b to limit rearward movement of the ring 22.

Slidably mounted on a part 23c of the core 23 to the rear of the ring 22 is a sleeve 39 having a pair of radially inwardly directed flanges forming annular jack pistons 37, 38, these pistons working in annular peripheral recesses or cylinders 35 and 36 in the core 23. A coil spring 36a is provided in the cylinder 36 urging the piston 38 rearwardly and the sleeve 39 extends forwardly to the ring 22 against which it abuts.

The sleeve 39, the pistons 37 and 38 and the cylinders 35 and 36 together constitute a first hydraulically operable stop withdrawal means operable to render the aforementioned first positive mechanical stop means inoperative. Likewise the sleeve 29, the jack piston 30 and the cylinder in which the piston 30 works together constitute a second hydraulically operable stop withdrawal means operable to render the aforementioned second positive mechanical stop means inoperative.

The core 23 has a central bore 40 which houses a piston valve 41 slidable therein. The bore is stepped at 40b to an increased diameter 40c. A flange 41a on the piston valve limits movement of the valve in the rearward direction. A coil spring 42 is interposed between the flange 41a and the forward end of the bore 40. The outer diameter of the piston valve 41 is provided with an annular recess 43 which, when the piston valve is in the rearward position (as shown in the drawing), places a passageway 44 in communication with a drain passageway 45. Passageway 44 is in communication with the chamber 35b to the rear of piston 37 and with the chamber 36b to the rear of the piston 38. Chambers 35c and 36c forward of piston 37 and 38 respectively are in communication with the drain passageway 45.

The chamber 46 to the rear of the piston valve 41 is in communication through a passageway 47 with a conduit 48 which is a decrease pitch fluid conduit for leading hydraulic fluid to and from the decrease pitch side of the pitch change motor. Thus the conduit 48 leads hydraulic fluid under pressure to the rearward, that is to say, the decrease pitch side of the ram 16. The bore 40 forward of the piston valve 41 is connected through a passageway 49 with a conduit 50 which leads hydraulic fluid to and from the forward, that is to say, the increase pitch side of the ram 16.

Increase pitch pressure fluid passes from the conduit 50 through a passageway 52 into an annular space 53, and then through the spaces between the resilient fingers 21, and through the slots 19a to the forward side of the ram 16.

A further passageway 45a connects an annular chamber 54 in which the rearward end of the sleeve 39 slides, with the drain passageway 45.

A conduit 55 or "third oil line" passes through the hub in convenient manner to an annular chamber 56 formed in the sleeve 29, and ports 57 place the chamber 56 in communication with a chamber 58 to the rear of the piston 30, while the chamber 59 forward of the piston 30 is communicated through ports 60 and 61 with the increase pitch side of the ram 16.

During normal flight the pitch change range of the propeller is positively limited in the pitch decrease direction at a "flight cruise" position by the stops 20 which are held out in the path of the shoulders 26a, 26b and 26c by the step 22b of the ring 22, this step then engaging within the ring of stops 20 and the shoulder 26a then co-operating with the stops 20 to form a flight cruise stop when the shoulder 26a comes up against rearward chamfers on the stops 20. Under these conditions the ring is in its extreme rearward position and is held in this position by the coil spring 24. The flight cruise stop in the example being described corresponds to a 37 degree pitch angle of the propeller blades, and is provided to prevent undue windmilling speeds of the propeller occurring in the event of a failure of the constant speed unit controlling the pitch of the propeller allowing the propeller to fine off while the aircraft is moving at a high forward speed.

When it is required to adjust the propeller into a pitch less than 37 degrees, for example when preparing to land, the propeller is fined off onto the flight cruise stop.

This is usually done by setting the datum of the constant speed unit controlling the pitch of the propeller so that the constant speed unit calls for a propeller pitch which is less than that set by the flight cruise stop.

In order to fine off the propeller, hydraulic fluid under pressure is supplied to the decrease pitch side of the ram 16 through the conduit 48 and passes to the right hand side of the ram in the drawing. The pressure of fluid in the fine pitch conduit 48 is transmitted through the conduit 47 to the chamber 46. It is arranged, however, that the normal operating maximum value of the pressure of fluid in the conduit 48, and therefore in the chamber 46, is insufficient to overcome the action of the spring 42 and displace the piston valve 41 forwardly. The maximum pressure which can be attained by the decrease pitch fluid in the conduit 48 under normal operating conditions is usually set by a relief valve which is arranged to open and bypass fluid from the conduit 48 to the suction side of the pump of the constant speed unit when the pressure in the conduit 48 reaches the normal maximum value.

In order to adjust the propeller into a pitch less than 37 degrees this relief valve is gagged so that when the shoulder 26a comes up against the stops 20 and the ram 16 is prevented from further movement in the pitch fining direction, the pressure on the decrease pitch side of the hydraulic system of the pitch change motor is able to rise above the normal operating maximum value, the increased pressure transmitted to the chamber 46 overcoming the action of the spring 42 and displacing the piston valve 41 forwardly, that is to say, to the left in the drawing so as to open the passage 44 to the chamber 46.

Fluid under pressure is then delivered from the decrease pitch fluid conduit 48 through the conduit 47 the chamber 46 and the passage 44 to the cylinder spaces 35b and 36b respectively, and the jack means comprising the pistons 37 and 38 is operated and the sleeve 39 is displaced forwardly thereby pushing the ring 22 forwardly to bring the step 22c on the ring radially within the ring of stops 20. Operation of the jack means as just described is accompanied by the exhaust of hydraulic fluid from the cylinder spaces 35c and 36c through the drain conduit 45.

The resilient fingers 21 constitute spring means which tend to urge the stop 20 into their position as shown in the drawing, that is to say in which they lie in the path of movement of the shoulder 26b and the shoulder 26c but out of the path of movement of the shoulder 26a.

The sleeve 39 has a limited range of forward movement sufficient to displace the ring 22 from a first position in which the step 22b lies radially within the ring of stops 20 through a first range of movement to bring the ring to a position as shown in the drawing.

As soon as the ring 22 has been displaced as just described the ram 16 becomes free to slide over the stops 20 until the shoulder 26b on the ram comes up against the stops.

If, when the propeller has been fined off on to the flight cruise stop and the ring 22 has been displaced to its position as shown in the drawing, the constant speed unit is still calling for a finer propeller pitch, the ram 16 will immediately move forward over the stops 20 in the manner described thus relieving the pressure in the fine pitch conduit 48 and therefore in the chamber 46. The valve 41 will consequently move back under the action of the spring 42 to its position as shown in the drawing. In these circumstances, however, the spring 24 is unable to return the ring 22 to its rearmost position since the stops 20 are prevented from moving outwardly by the sleeve 26 which is now enclosing the stops at its forward end.

If, however, the ram 16 is moved in the pitch coarsening direction, that is to say to the right in the drawing, as soon as the shoulder 26a clears the stops 20 the spring 24 will push the ring 22 rearwardly to engage the step 22b within the ring of stops 20, the steps and the ring having co-operating chamfered faces which act to push the stops outwardly as the ring 22 is moved to its rearmost position. The sleeve 29 is returned to its rearward position, by the spring 36a, as soon as the valve 41 is returned to its position as shown in the drawing, hydraulic fluid exhausting from the cylinder spaces 35b and 36b through the conduit 44, the annular recess 43 in the valve 41 and the conduit 45 to the cylinder spaces 35c and 36c.

The decrease pitch fluid pressure relief valve may communicate with the suction side of the pump through the increase pitch fluid conduit extending from the constant speed unit to the conduit 50 in the propeller hub.

In these circumstances the relief valve has to open against the pressure of fluid in the increase pitch fluid conduit and ensures that the pressure of fluid in the conduit 48 does not exceed the pressure of fluid in the conduit 50 by more than a predetermined amount. For the purpose of the present specification, therefore, the term "normal operating maximum value" as applied to the pressure of fluid in the conduit 48 is to be taken as including the "normal operating maximum pressure differential" in the case where the relief valve is arranged to open against a load which is variable in dependence upon the magnitude of a fluid pressure which is itself variable during operation of the propeller, the normal operation maximum pressure differential being taken as that pressure differential between the pressure of fluid in the decrease pitch fluid conduit, and the pressure against which the relief valve has to open, which the relief valve normally ensures shall not be exceeded.

The shoulder 26b co-operates with the stops 20 to form a flight fine pitch stop which, in the present example, is set at a propeller pitch of 22 degrees. The flight fine pitch stop is operative to prevent pitch fining movement of the propeller to a pitch less than 22 degrees during all phases of flight, and is required to be removed, that is to say rendered inoperative, only after touch down of the aircraft in order that the propeller may be moved into a superfine pitch for the purpose of braking the aircraft on the runway by creating a propeller drag.

In order to allow the propeller to fine off to a pitch less than 22 degrees, hydraulic fluid under pressure is supplied through the "third oil line" 55 to the annular chamber 56 and through the ports 57 into the cylinder space 58, whereupon the hydraulic jack comprising the piston 30 is operated and the sleeve 29 moves forward on the core 23 and the shoulder 29a engages behind the flange 22e whereafter the continued forward movement of the sleeve 29 displaces the ring 22 further forward through a second range of movement against the action of the spring 24 to bring the step 22d of the ring radially within the ring of stops 20 so that the shoulder 26b is free to force the stops inwardly on to the step 22d thereby freeing the ram for further sliding movement to the left in the drawing, and over the stops, to adjust the propeller in a superfine pitch range limited ultimately by the shoulder 26c on the ram when this shoulder comes up against the stops 20.

As soon as the pressure of fluid in the "third oil line" is relieved the spring 24 will tend to push the ring 22 back to its rearmost position. This is however prevented by the ram which holds the stops 20 inwardly on the step 22d of the ring. As soon as the pitch of the propeller is coarsened to an angle greater than 22 degrees however the spring 24 becomes free to push the ring 22 rearwardly to bring the stop on to the step 22c of the ring 22 thereby resetting the flight fine pitch stop, whilst coarsening movement to an angle greater than 37 degrees allows the flight cruise stop to be set as previously described, the spring 24 pushing the ring 22 to its rearmost position together with the sleeve 39, and the ring 22 forcing the stops 20 outwardly into the path of movement of the shoulder 26a.

From the foregoing description it will be seen that the jack means comprising the pistons 37, 38 is operable independently of movement of the jack piston 30, and vice versa. It will also be seen that the jack piston 30 is operable by hydraulic fluid under pressure supplied through the "third oil line" to displace the ring 22 from its rearmost or first position through both its first and second ranges of movement if desired. The jack means comprising the piston 30 may therefore be actuated to render both the flight cruise stop and the flight fine pitch stop inoperative in one operation.

The propeller described with reference to the drawing may be readily modified to function as a reversible pitch propeller if desired.

To this end all that is necessary is to lengthen the permissible stroke of the piston 30 so that when hydraulic fluid under pressure is supplied through the "third oil line" 55 the ring 22 is displaced forwardly sufficiently far to clear the ring from within the ring of stops 20 so that the stops may be moved inwardly of the step 22d on the ring 22 out of the path of the shoulder 26c on the ram, when the shoulder 26c comes up against the stops, thus freeing the ram for further movement to the left in the drawing to adjust the propeller into reverse pitch.

In this case the shoulder 26c constitutes a third stop means operative to prevent relative movement of the ram and cylinder to adjust the propeller into a pitch less than a third predetermined pitch which is itself less than that determined by the shoulder 26b, the shoulder 26c forming a superfine pitch stop and being positioned to engage the stops 20 when the ram has been moved to a position corresponding to a propeller pitch of 0°.

In the case of the modified propeller just described, in order to allow the propeller to fine off to a pitch less than 22°, hydraulic fluid under pressure is supplied through the "third oil line" 55 as before so that the sleeve 29 displaces the ring further forward from its position as shown in the drawing through its second range of movement, which in this case, in view of the longer stroke of the piston 30, is sufficient to clear the ring 22 from within the ring of stops 20 as previously described.

The shoulder 26b then forces the stops 20 inwardly, so that the stops clear the shoulder 26b and slide along the cylindrical surface of the sleeve 26 between the shoulders 26b and 26c, the stops being held out against this surface by the resilient fingers 21.

As soon as the stops 20 clear the shoulder 26b the "third oil line" 55 is communicated with drain so that the spring 24 returns the ring 22 to the right in the drawing and the step 22d moves within the ring of stops 20 to hold the stops 20 out in the path of the shoulder 26c.

When it is required to allow the propeller to move into reverse pitch, fluid under pressure is again supplied through the "third oil line" 55 so that the shoulder 26c is able to force the stops further inwardly and pass over them, the stops sliding along the cylindrical surface of the sleeve 26 to the right in the drawing of the shoulder 26c and the ram adjusting the propeller into reverse pitch.

In the case of the non-reversible construction it will be appreciated that the shoulder 26c constitutes an ultimate stop limiting the movement of the ram in the pitch fining direction, that is to say, to the left in the drawing. If desired, this ultimate stop could be provided by the inwardly directed surface 17a of the cylinder 17 and the shoulder 26c dispensed with. In this case the sleeve 26 would be formed with two shoulders only corresponding in function to the shoulders 26a and 26b but occupying respectively the radial positions at which the shoulders 26b and 26c are disposed. Also in this case the ring 22 would be modified to the extent that when the ring of stops 20 is held out by the step 22b of the ring 22 the stops 20 would assume the position shown in the drawing, the stops when engaged on the step 22c clearing the leading shoulder on the sleeve 26 and when engaged on the step 22d clearing the second shoulder on the sleeve 26 and being fully retracted into the barrel.

By forming the sleeve 26 with three shoulders however as has been described with reference to the drawing: the non-reversible propeller is readily convertible to function as a reversible pitch propeller having a superfine pitch stop in the manner previously described.

We claim:

1. A hydraulic variable pitch propeller comprising a hub, a plurality of propeller blades journalled on the hub for rotation each about its longitudinal pitch change axis, a double acting hydraulic pitch change motor in said hub, said motor being operatively connected with said blades and comprising a ram and cylinder movable relative to one another to adjust the pitch of the propeller, decrease pitch fluid conduit means for leading hydraulic fluid to and from the decrease pitch side of said pitch change motor, increase pitch fluid conduit means for leading hydraulic fluid to and from the increase pitch side of said pitch change motor, a first positive mechanical stop means operative to prevent relative movement of said ram and cylinder to adjust the propeller into a pitch less than a first predetermined pitch, a second positive mechanical stop means operative to prevent relative movement of said ram and cylinder to adjust the propeller into a pitch less than said second predetermined pitch, said second predetermined pitch being less than said first predetermined pitch, first hydraulically operable stop withdrawal means operable to render said first positive mechanical stop means inoperative, second stop means operative to prevent relative movement of said ram and cylinder to adjust the propeller into a pitch less than a second predetermined pitch, said second predetermined pitch being less than said first predetermined pitch, second hydraulically operable stop withdrawal means operable to render said second positive mechanical stop means inoperative, hydraulic fluid conduit means separate from said decrease pitch and increase pitch fluid conduit means for leading hydraulic fluid to said second stop withdrawal means to operate said second stop withdrawal means, duct means connecting said decrease pitch fluid conduit means to said first stop withdrawal means, and valve means in said duct means operable when the pressure of fluid in said decrease pitch fluid conduit means is increased above a normal operating maximum value to permit the supply of hydraulic fluid through said duct means from said decrease pitch fluid conduit means to said first stop withdrawal means to operate said first stop withdrawal means.

2. A hydraulic variable pitch propeller comprising a hub, a plurality of propeller blades journalled on the hub for rotation each about its longitudinal pitch change axis, a double acting hydraulic pitch change motor in said hub, said motor being operatively connected with said blades and comprising a ram and cylinder movable relative to one another to adjust the pitch of the propeller, decrease pitch fluid conduit means for leading hydraulic fluid to and from the decrease pitch side of said pitch change motor, increase pitch fluid conduit means for leading hydraulic fluid to and from the increase pitch side of said pitch change motor, a first positive mechanical stop means operative to prevent relative movement of said ram and cylinder to adjust the propeller into a pitch less than a first predetermined pitch, a second positive mechanical stop means operative to prevent relative movement of said ram and cylinder to adjust the propeller into a pitch less than said second predetermined pitch, said second predetermined pitch being less than said first predetermined pitch, first hydraulically operable stop withdrawal means operable to render said first positive mechanical stop means inoperative, second hydraulically operable stop withdrawal means operable to render said second positive mechanical stop means inoperative, a hydraulic fluid conduit means separate from said decrease pitch and increase pitch fluid conduit means for leading hydraulic fluid to said second stop withdrawal means to operate said second stop withdrawal means, duct means connecting said decrease pitch fluid conduit means to said first stop withdrawal means, and hydraulically operable valve means in said duct means operable by the pressure of fluid in said decrease pitch fluid conduit means when said pressure is increased above a normal operating maximum value to permit the supply of hydraulic fluid through said duct means from said decrease pitch fluid conduit means to said first stop withdrawal means to operate said first stop withdrawal means.

3. A hydraulic variable pitch propeller comprising a hub, a plurality of propeller blades journalled on the hub for rotation each about its longitudinal pitch change axis, a double acting hydraulic pitch change motor in said hub, said motor being operatively connected with said blades and comprising a ram and cylinder movable relative to one another to adjust the pitch of the propeller, decrease pitch fluid conduit means for leading hydraulic fluid to and from the decrease pitch side of said pitch change motor, increase pitch fluid conduit means for leading hydraulic fluid to and from the increase pitch side of said pitch change motor, a first positive mechanical stop means operative to prevent relative movement of said ram and cylinder to adjust the propeller into a pitch less than a first predetermined pitch, a second positive mechanical stop means operative to prevent relative movement of said ram and cylinder to adjust the propeller into a pitch less than said second predetermined pitch, said second predetermined pitch being less than said first predetermined pitch, third positive mechanical stop means operative to prevent relative movement of said ram and cylinder to adjust the propeller into a pitch less than a third predetermined pitch which is itself less than said second predetermined pitch, first hydraulically operable stop withdrawal means operable to render said first positive mechanical stop means inoperative, second hydraulically operable stop withdrawal means operable to render said second positive mechanical stop means and said third positive mechanical stop means inoperative, hydraulic fluid conduit means separate from said decrease pitch and increase pitch fluid conduit means for leading hydraulic fluid to said second stop withdrawal means to operate said second stop withdrawal means, duct means connecting said decrease pitch fluid conduit means to said first stop withdrawal means, and valve means in said duct means operable when the pressure of fluid in said decrease pitch fluid condiut means is increased above a normal operating maximum value to permit the supply of hydraulic fluid through said duct means from said decrease pitch fluid conduit means to said first stop withdrawal means to operate said first stop withdrawal means.

4. A hydraulic variable pitch propeller comprising a hub, a plurality of propeller blades journalled on the hub for rotation each about its longitudinal pitch change axis, a double acting hydraulic pitch change motor in said hub, said motor being operatively connected with said blades and comprising a ram and cylinder movable relative to one another to adjust the pitch of the propeller, decrease pitch fluid conduit means for leading hydraulic fluid to and from the decrease pitch side of said pitch change motor, increase pitch fluid conduit means for leading hydraulic fluid to and from the increase pitch side of said pitch change motor, a first positive mechanical stop means operative to prevent relative movement of said ram and cylinder to adjust the propeller into a pitch less than a first predetermined pitch, a second positive mechanical stop means operative to prevent relative movement of said ram and cylinder to adjust the propeller into a pitch less than said second predetermined pitch, said second predetermined pitch being less than said first predetermined pitch, said first and second positive mechanical stop means including a common displaceable stop retaining member having a first position for maintaining both said positive mechanical stop means operative and spring means urging said retaining member into its first position, first hydraulically operable stop withdrawal means operable to displace said stop retaining member against the action of said spring means from its first position to a second position to render said first positive mechanical stop means inoperative, second hydraulically operable stop withdrawal means operable to displace said stop retaining member against the action of said spring means from its second position to a third position to render said second positive mechanical stop means inoperative, hydraulic fluid conduit means separate from said decrease pitch and increase pitch fluid conduit means for leading hydraulic fluid to said second stop withdrawal means to operate said second stop withdrawal means, duct means connecting said decrease pitch fluid conduit means to said first stop withdrawal means, and valve means in said duct means operable when the pressure of fluid in said decrease pitch fluid conduit means is increased above a normal operating maximum value to permit the supply of hydraulic fluid through said duct means from said decrease pitch fluid conduit means to said first stop withdrawal means to operate said first stop withdrawal means.

5. A hydraulic variable pitch propeller comprising a hub, a plurality of propeller blades journalled on the hub for rotation each about its longitudinal pitch change axis, a double acting hydraulic pitch change motor in said hub, said motor being operatively connected with said blades and comprising a ram and cylinder movable relative to one another to adjust the pitch of the propeller, decrease pitch fluid conduit means for leading hydraulic fluid to and from the decrease pitch side of said pitch change motor, increase pitch fluid conduit means for leading hydraulic fluid to and from the increase pitch side of said pitch change motor, a first positive mechanical stop means operative to prevent relative movement of said ram and cylinder to adjust the propeller into a pitch less than a first predetermined pitch, a second positive mechanical stop means operative to prevent relative movement of said ram and cylinder to adjust the propeller into a pitch less than said second predetermined pitch, said second predetermined pitch being less than said first predetermined pitch, third positive mechanical stop means operative to prevent relative movement of said ram and cylinder to adjust the propeller into a pitch less than a third predetermined pitch which is itself less than said second predetermined pitch, said first, second and third positive mechanical stop means including a common displaceable stop retaining member having a first position for maintaining all said positive mechanical stop means operative, and spring means urging said retaining member to its first position, first hydraulically operable stop withdrawal means operable to displace said stop retaining member against the action of said spring means from its first position to a second position to render said first positive mechanical stop means inoperative, second hydraulically operable stop withdrawal means operable to displace said stop retaining member against the action of said spring means from its second position to a third position to render said second and third positive mechanical stop means inoperative, hydraulic fluid conduit means separate from said decrease pitch and increase pitch fluid conduit means for leading hydraulic fluid to said second stop withdrawal means to operate said second stop withdrawal means, duct means connecting said decrease pitch fluid conduit means to said first stop withdrawal means, and valve means in said duct means operable when the pressure of fluid in said decrease pitch fluid conduit means is increased above a normal operating maximum value to permit the supply of hydraulic fluid through said duct means from said decrease pitch fluid means to said first stop withdrawal means to operate said first stop withdrawal means.

6. A hydraulic variable pitch propeller comprising a hub, a plurality of propeller blades journalled on the hub for rotation each about its longitudinal pitch change axis, a double acting hydraulic pitch change motor in said hub, said motor being operatively connected with said blades and comprising a ram and cylinder movable relative to one another to adjust the pitch of the propeller, decrease pitch fluid conduit means for leading hydraulic fluid to and from the decrease pitch side of said pitch change motor, increase pitch fluid conduit means for leading hydraulic fluid to and from the increase pitch side of said pitch change motor, a first positive mechanical stop means operative to prevent relative movement of said ram and cylinder to adjust the propeller into a pitch less than a first predetermined pitch, a second positive mechanical stop means operative to prevent relative movement of said ram and cylinder to adjust the propeller into a pitch less than said second predetermined pitch, said second predetermined pitch being less than said first predetermined pitch, said first and second positive mechanical stop means including a common displaceable stop retaining member having a first position for maintaining both said positive mechanical stop means operative and spring means urging said retaining member into its first position, a first hydraulic jack operable to displace said stop retaining member against the action of said spring means from its first position to a second position to render said first positive mechanical stop means inoperative, a second hydraulic jack operable to displace said stop retaining member against the action of said spring means from its second position to a third position to render said second positive mechanical stop means inoperative, said hydraulic jacks being operable each independently of movement of the other, hydraulic fluid conduit means separate from said decrease pitch and increase pitch fluid conduit means for leading hydraulic fluid to said second hydraulic jack to operate the jack, duct means connecting said decrease pitch fluid conduit means to said first hydraulic jack, and valve means in said duct means operable when the pressure of fluid in said decrease pitch fluid conduit means is increased above a normal operating maximum value to permit the supply of hydraulic fluid through said duct means from said decrease pitch fluid conduit means to operate said first hydraulic jack.

7. A hydraulic variable pitch propeller comprising a hub, a plurality of propeller blades journalled on the hub for rotation each about its longitudinal pitch change axis, a double acting hydraulic pitch change motor in said hub, said motor being operatively connected with said blades and comprising a ram and cylinder movable relative to one another to adjust the pitch of the propeller, decrease pitch fluid conduit means for leading hydraulic fluid to and from the decrease pitch side of said pitch change motor, increase pitch fluid conduit means for leading hydraulic fluid to and from the increase pitch side of said pitch change motor, a first positive mechanical stop means operative to prevent relative movement of said ram and cylinder to adjust the propeller into a pitch less than a first predetermined pitch, a second positive mechanical stop means operative to prevent relative movement of said ram and cylinder to adjust the propeller into a pitch less than said second predetermined pitch, said second predetermined pitch being less than said predetermined pitch, third positive mechanical stop means operative to prevent relative movement of said ram and cylinder to adjust the propeller into a pitch less than a third predetermined pitch which is itself less than said second predetermined pitch, said first, second and third positive mechanical stop means including a common displaceable stop retaining member having a first position for maintaining all said positive mechanical stop means operative, and spring means urging said retaining member to its first position, a first hydraulic jack operable to displace said stop retaining member against the action of said spring means from its first position to a second position to render said first positive mechanical stop means inoperative, a second hydraulic jack operable to displace said stop retaining member against the action of said spring means from its second position to a third position to render said second and third positive mechanical stop means inoperative, said hydraulic jacks being operable each independently of movement of the other, hydraulic fluid conduit means separate from said decrease pitch and increase pitch fluid conduit means for leading hydraulic fluid to said second hydraulic jack to operate the jack, duct means connecting said decrease pitch fluid conduit means to said first hydraulic jack, and valve means in said duct means operable when the pressure of fluid in said decrease pitch fluid conduit means is increased above a normal operating maximum value to permit the supply of hydraulic fluid through said duct means from said decrease pitch fluid conduit means to operate said first hydraulic jack.

8. A propeller as claimed in claim 4, wherein said ram is slidable in said cylinder to adjust the pitch of the propeller, and said first and second positive mechanical stop means comprise respectively first and second shoulders on said ram, and a stop which, in said first position of said stop retaining member is held by said stop retaining member in a first position in which it lies in the path of movement of both said shoulders, said stop being movable from its first position out of the path of movement of said first shoulder to a second position in which it lies only in the path of movement of said second shoulder when said stop retaining member is displaced to its second position and to a third position in which it lies out of the path of movement of both said shoulders when the stop retaining member is displaced to its third position.

9. A propeller as claimed in claim 5, wherein said ram is slidable in said cylinder to adjust the pitch of the propeller and said first, second and third positive mechanical stop means comprise respectively first, second and third shoulders on said ram, and a stop which, in said first position of said stop retaining member is held by said stop retaining member in a first position in which it lies in the path of movement of all three of said shoulders, said stop being movable from its first position out of the path of movement of said first shoulder to a second position in which it lies only in the path of movement of said second and third shoulders when said stop retaining member is displaced to its second position, and to third and fourth positions in which it lies respectively out of the path of movement of said first and second shoulders and said first, second and third shoulders when the stop retaining member is displaced to its third position.

10. A propeller as claimed in claim 8, wherein spring means is provided urging said stop to its second position, said second shoulder and said stop have surfaces which co-operate to urge said stop to its third position when said second shoulder is engaging said stop and the ram is moved in the pitch fining direction, and said stop retaining member and said stop have surfaces which co-operate to urge said stop from its second position to its first position when the stop retaining member is moved back to its first position.

11. A propeller as claimed in claim 9, wherein spring means is provided urging said stop to its second position, said second shoulder and said stop have surfaces which co-operate to urge said stop to its third position when said second shoulder is engaging said stop and the ram is moved in the pitch fining direction, said third shoulder also having a surface which co-operates with said stop surface to urge said stop from its third position to its fourth position when said third shoulder is engaging said stop and the ram is moved into a reversed pitch position, and wherein said stop retaining member and said stop have surfaces which co-operate to urge said stop from its second position to its first position when said stop retaining member is moved back to its first position.

12. A propeller as claimed in claim 8, wherein said ram is annular, and slides on a barrel within the propeller hub, and a ring of said stops is provided, the stops being supported from within the barrel and projecting from the barrel each through a slot in the barrel at least when said first and/or second positive mechanical stop means is operative, and said stop retaining member comprises a ring slidably mounted on a core in said barrel, said ring having a stepped outer periphery providing a radially outer step which engages within said ring of stops to hold said stops in their first position when the stop retaining member is in its first position, a step which is disposed radially inwardly of said first said step and which engages within said ring of stops to hold said stops in their second position when the stop retaining member is in its second position, and a step which is disposed radially inwardly of said second said step and which engages within said ring of stops when the stop retaining member is in its third position and the stops have been moved to their third position.

13. A propeller as claimed in claim 9, wherein said ram is annular and slides on a barrel within the propeller hub, and a ring of said stops is provided, the stops being supported from within the barrel and projecting from the barrel each through a slot in the barrel when said first, second and third positive mechanical stop means are operative, and said stop retaining member is in the form of a stop retaining ring slidably mounted on a core in said barrel, said stop retaining ring having a stepped outer periphery providing a radially outer step which engages within said ring of stops to hold said stops in their first position when the stop retaining member is in its first position, a step which is disposed radially inwardly of said first said step and which engages within said ring of stops to hold said stops in their second position when the stop retaining member is in its second position, and a step which is disposed radially inwardly of said second said step, the stop retaining member, when in its third position clearing said stops and allowing movement of the stops first to their third and then to their fourth positions.

14. A propeller as claimed in claim 12, wherein said first hydraulically operable stop withdrawal means is a hydraulic jack comprising a sleeve slidable on said core, and a radially inwardly directed flange on said sleeve, said flange constituting a jack piston and working in an annular cylinder formed by an annular peripheral recess in said core.

15. A propeller as claimed in claim 14, wherein said hydraulic jack further comprises a second radially inwardly directed flange on said sleeve, said second flange constituting a further jack piston and working in a second annular cylinder formed by a further annular peripheral recess in said core.

16. A propeller as claimed in claim 14, wherein said stop-retaining ring is positioned forwardly of said sleeve and the sleeve engages and pushes the stop-retaining ring forward when said jack means is operated.

17. A propeller as claimed in claim 12, wherein said second hydraulically operable stop withdrawal means is a hydraulic jack comprising an annular cylinder in said barrel and surrounding said core, a sleeve slidable on said core, a radially outwardly directed flange on said sleeve, said flange constituting a jack piston and working in said annular cylinder.

18. A propeller as claimed in claim 17 wherein said sleeve is slidable on a forward portion of said core of a diameter less than the portion of said core which slidably carries said stop-retaining ring, the sleeve lying in part within the stop-retaining ring and the stop-retaining ring having an inwardly directed part lying in the path of movement of a forwardly facing shoulder on said sleeve, said shoulder engaging said part and pulling said stop-retaining ring forward when said second jack means is operated.

References Cited in the file of this patent

UNITED STATES PATENTS

| | | |
|---|---|---|
| 2,174,717 | Caldwell | Oct. 3, 1939 |
| 2,477,868 | Forman | Aug. 2, 1949 |
| 2,600,017 | Morris | June 10, 1952 |
| 2,704,583 | Jedrziewski | Mar. 22, 1955 |

FOREIGN PATENTS

| | | |
|---|---|---|
| 737,745 | Great Britain | Sept. 28, 1955 |
| 742,148 | Great Britain | Dec. 21, 1955 |